(12) United States Patent
Dünne

(10) Patent No.: US 9,670,102 B2
(45) Date of Patent: Jun. 6, 2017

(54) METHOD FOR RESTORING A CEMENTITIOUS SYSTEM

(71) Applicant: SIKA TECHNOLOGY AG, Baar (CH)

(72) Inventor: Thomas Dünne, Vreden (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/759,366

(22) PCT Filed: Dec. 19, 2013

(86) PCT No.: PCT/EP2013/077366
§ 371 (c)(1),
(2) Date: Jul. 6, 2015

(87) PCT Pub. No.: WO2014/106590
PCT Pub. Date: Jul. 10, 2014

(65) Prior Publication Data
US 2015/0354237 A1  Dec. 10, 2015

(30) Foreign Application Priority Data

Jan. 7, 2013 (EP) .................... 13150406

(51) Int. Cl.
*C04B 40/00* (2006.01)
*C04B 41/00* (2006.01)
(Continued)

(52) U.S. Cl.
CPC ........ *C04B 41/009* (2013.01); *C04B 41/4505* (2013.01); *C04B 41/52* (2013.01);
(Continued)

(58) Field of Classification Search
CPC ....... C04B 41/52; C04B 41/70; C04B 41/009; C04B 41/4505; C04B 2111/72; E04H 7/18; E04G 23/02
(Continued)

(56) References Cited

U.S. PATENT DOCUMENTS 2,313,110 A * 3/1943 Wertz ................. B28B 23/0081
264/128
4,536,417 A * 8/1985 Shimizu ................ C04B 41/009
427/140
(Continued)

FOREIGN PATENT DOCUMENTS

EP  0 264 541 A1  4/1988

OTHER PUBLICATIONS

Mar. 25, 2014 Search Report issued in International Application No. PCT/EP2013/077366.
(Continued)

*Primary Examiner* — Charles A Fox
*Assistant Examiner* — James Buckle, Jr.
(74) *Attorney, Agent, or Firm* — Oliff PLC

(57) ABSTRACT

Described is a method for restoring a cementitious system, the method having the following steps: a) securing a filling body provided with holes at a distance from the cementitious system to be restored, b) applying mortar to the cementitious system to be restored and to the filling body provided with openings, and c) introducing a cement containing an alkali storage system into the filling body provided with openings so that the cement containing an alkali storage system is in contact with the mortar. A corresponding cementitious system is also described.

14 Claims, 1 Drawing Sheet

(51) Int. Cl.
  *C04B 41/45* (2006.01)
  *E04H 7/18* (2006.01)
  *C04B 41/52* (2006.01)
  *C04B 41/70* (2006.01)
  *E04G 23/02* (2006.01)
  *C04B 111/72* (2006.01)

(52) U.S. Cl.
  CPC .............. *C04B 41/70* (2013.01); *E04G 23/02* (2013.01); *E04H 7/18* (2013.01); *C04B 2111/72* (2013.01)

(58) Field of Classification Search
  USPC .......................................................... 52/466
  See application file for complete search history.

(56) References Cited

U.S. PATENT DOCUMENTS

| | | | |
|---|---|---|---|
| 5,309,692 A * | 5/1994 | Hayashi | .............. E04G 23/0203 405/259.4 |
| 8,205,405 B2 * | 6/2012 | Sawada | ................... E04F 13/02 52/316 |
| 2008/0105564 A1 * | 5/2008 | Glass | ...................... C23F 13/16 205/734 |

OTHER PUBLICATIONS

Jun. 28, 2016 Office Action issued in Chinese Patent Application No. 201380069787.0.
Jul. 7, 2015 International Preliminary Report on Patentability issued in International Applicaton No. PCT/EP2013/077366.
Mar. 16, 2017 Office Action issued in Chinese Patent Application No. 201380069787.0.

* cited by examiner

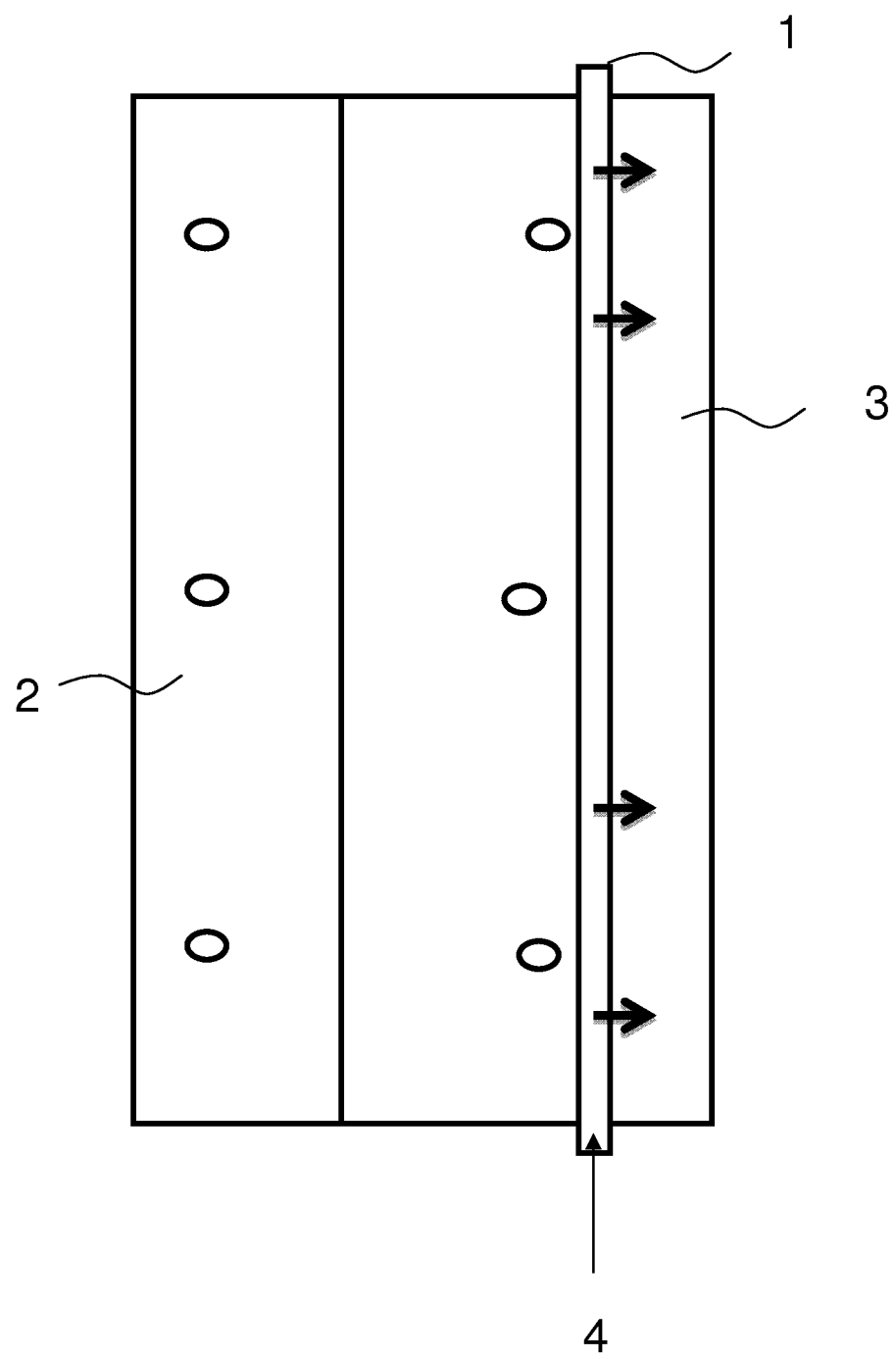

METHOD FOR RESTORING A CEMENTITIOUS SYSTEM

TECHNICAL AREA

The invention relates to a method for restoring a cementitious system as well as the cementitious system obtained by means of this method.

PRIOR ART

Most potable water containers currently in operation consist of mineral, cement-bound construction materials with claddings made of various materials. Such potable water containers, especially ones based on reinforced concrete, have a multiplicity of uses. The service life of interior concrete surfaces is about 20 years, which results in a need for restoration products. Predominantly cement-bound systems are used as restoration products. These systems are so-called porous building materials, which are naturally subjected to attack mechanisms of the potable water. In the long term this results in destruction of the restoration products.

In the meantime, the damage mechanism which destroys the restoration products, i.e., the cement-bound systems, is known. Various attack mechanisms, such as leaching, dissolving attack and hydrolytic corrosion, play a role.

Known systems attempt to minimize possible leaching, i.e., loss or decomposition of calcium hydroxide ($Ca(OH)_2$), by limiting the diffusion capacity. In this, especially the porosity of the restoration products used plays a role.

In causing cement to react with water, so-called hydrate phases are formed in complex chemical reactions, wherein the calcium silicate hydrate (CSH phases) represent the major share. In addition, about 20% of the calcium hydroxide, related to the weight of the cement, is released. The calcium hydroxide is predominantly stored in the pore solution with which the pore system of cement-bound materials is filled. The smaller portion is dissolved in the pore solution with which the pore system of cement-bound materials is filled. This solution is responsible for the relatively high pH of about 12.3 to 13.0 of a cement-bound material.

The standing water differs markedly from the composition of the pore solution. From this there arise differences in concentration, which lead to a transport, which is designated as diffusion. The dissolved ions from the coating migrate into the standing potable water, leading to a leaching of the cement. Due to the greater difference in concentration, diffusion occurs to an amplified extent in soft water, i.e., in water which is deficient in alkali and alkali metals, with primarily the alkali and alkali earth metals found in the cement-bound coating, such as sodium, potassium, magnesium and calcium ions, being mobilized. Due to the higher solubility, the chemical compounds containing sodium, potassium and magnesium ions are more or less completely dissolved in the pore solution, and therefore these are quickly leached out in comparison with the calcium ions. The already-mentioned hydration products, i.e., the CSH phases, are in chemical equilibrium with the pore water.

If, with constant water contact, there now is a reduction in the calcium ion concentration in the pore solution, then first the solid calcium hydroxide in the cement matrix is dissolved to maintain the equilibrium. This process continues to run until all of the calcium hydroxide has leached out. Then the calcium ions bound in the CSH phase are released, to stabilize the chemical equilibrium between the solid phase (cement) and the liquid phase (pore solution). The continuously progressing transport of calcium ions into the standing water ultimately results in complete leaching and thus to decomposition of the cement-bound coating. The degree of leaching, which is only optically perceptible after complete decomposition of the layer by sand removal, can be quantitatively detected in analytical terms by determining the calcium hydroxide content as well as the change in porosity.

All of the known approaches assume that a certain quantity of calcium hydroxide can be chemically bound in mortar, and depending on the loading, this can be decomposed and the concrete substitute no longer exhibits any resistive force. To slow this decomposition process, in particular an effort is made to protect the mortar from without, or by adapting the recipe for it, to protect it from this leaching process.

The known measures in relation to adaptation of the recipe, and the requirements for the application process, have as their goal to reduce the overall porosity of the mortar and thus effect a maximally obtainable density of the surface produced, by which the leaching process is to be delayed as long as possible. However, these measures have their limitations. Due to governmental regulations, certain organic constituents, for example, can only be placed in limited use, and, along with the desired effects, can also cause disadvantageous properties in the mortar, since the organic contents count as being nutrient media for growth, which can be responsible for a possible germ contamination of the water. Additionally, limits are set for the known measures, in that for example, the water-cement value cannot be lowered to whatever extent desired, because otherwise the mortar would no longer be able to be processed. One substantial drawback of the known approaches, however, is that their only goal is to delay the leaching process. In temporal terms, however, this has only limited success, since the leaching process cannot be completely prevented.

SPECIFICATION OF THE INVENTION

The task of the present invention is to overcome the drawbacks of the prior art and to provide a method for restoring a cementitious system, which reduces the decomposition of restoration products and thus leads to a pronounced lengthening of the service life.

Surprisingly, the problem was able to be solved by a method according to claim 1 for restoration of a cementitious system, which comprises the following steps:
a) Securing a filling body provided with holes at a distance from said cementitious system to be restored
b) Applying mortar to the cementitious system to be restored and to said filling body provided with openings, and
c) Introducing a cement containing an alkali storage system into the filling body provided with openings so that the cement containing an alkali storage system is in contact with the mortar.

In contrast to the prior art, which only temporarily minimizes the leaching process, the present invention goes in a completely different supported way. The present invention only secondarily purposes to reduce the decomposition of the alkali deposit, which is present in lesser quantities in pore water, but also in crystalline form. Rather, the core of the present invention is to make available sufficient permanent alkali reserves, i.e. the leaching process is countered in that sufficient calcium hydroxide is made available, so that the decomposition of the restoration products is substantially delayed and their service life is markedly increased.¶

The present invention therefore results in an increased resistance force of the restoration products, primarily of the mortar, against attack from without from its own matrix. The invention-specific method does not have prevention of the leaching process as its primary goal, but rather is directed at making a sufficient alkali reserve available.

The invention-specific method thus makes available to the mortar an additional alkali reserve, which is available in a closed system within the mortar matrix as an alkali storage system, and delays the decomposition process substantially. The alkali deposit is not chemically bound. What is attained in this way is that the mortar used can exert an increased resistance force against attack from without from its own matrix.

The invention-specific method also is characterized in that the means used can be made available simply and in a cost-effective manner.

Using the invention-specific method, nearly all known cementitious systems can be restored. Preferably the cementitious system is mortar or concrete.

The filling body is provided with openings, so that contact is produced between the alkali storage system containing cement and the mortar applied.

In a preferred embodiment form, the filling body provided with openings is a filling body with holes, preferably a pipe, especially a hollow pipe, and very specially a hollow pipe made from two half shells. Such structures have an advantage in that they are easy to manufacture, and more cement can be stored in them than a normal mortar matrix could without a negative effect on characteristic mortar values.

The diameter of the openings is preferably 0.2 to 0.8 mm, especially about 0.5 mm. If a pipe is used, then preferably it has a diameter of 3 to 16 mm, and especially preferred, from 6 to 12 mm.

No special requirements are to be made for the material of the filling body. It can for example be composed of unalloyed and alloyed steels, high-grade steel or black steel.

The mortar used in step b) of the invention-specific method is subject to no limitations. However, it is advantageous if it satisfies certain requirements so that it can be used in supplying potable water.

In one preferred embodiment form, the mortar used in step b) therefore complies with the technical rules of the German Gas and Water Union, working page W 300, edition of June 2005, working page W 270, edition of November 2007 and working page W347, edition of May 2006 (Deutscher Verein des Gas- and Wasserfaches e. V. [German Gas and Water Union], Scientific & Technical Union, 1-3 Josef-Wirmer Strasse, Bonn 53123, Germany). Additionally it is advantageous if the mortar used in step b) complies with the GCRC guideline entitled "Protection and Restoration of Concrete Components," October 2001 edition (Deutscher Ausschuss für Stahlbeton e.V. [German Committee for Reinforced Concrete], 31 Budapester Strasse, Berlin 10787, Germany).

The mortar to be applied in step b) preferably is a restoration mortar or a spray-applied mortar. For example, Sika-110 HD, Sika-120 HD, Sika-130 HD, Sika Cem Gunit-212SF, Sika Cem Gunite-212S can be used, all obtainable from Sika Deutschland GmbH.

Preferably, the mortar is 10 to 40 mm thick, especially preferably from 15 to 30 mm.

It is preferred that a porosity gradient exists between the edge zone of the mortar layer (0 to 2 mm) and the middle of the mortar layer. This has an advantage in that the hydrolysis process is markedly decelerated. Preferably the porosity gradient is ≥1%.

In a preferred embodiment, a cement suspension is used as the cement containing an alkali storage system. This has the advantage of being highly reactive, highly concentrated in regard to the cement content and its fineness of grinding, and is very flowable. What is understood here by cement suspension is a mixture of microfine cement or ultrafine cement and water.

In another preferred embodiment form, a cement or cement suspension is used as the cement or cement suspension, in which all particles exhibit a size of less than 20 μm, especially preferred of less than 16 μm, and most especially preferred of less than 10 μm. Smaller particles yield an advantage in that the cement or cement suspension is more dilute, so that it can penetrate into the smallest cavities and boreholes.

No particular requirements are made for the cement or cement suspension to be used. Thus, for example, cement and cement suspensions based on Portland cement, Portland slag cement, Portland silica powder cement, Portland pozzolana cement, Portland fly ash cement, Portland slate cement, Portland limestone cement, Portland composite cement, blast furnace cement, pozzolana cement and composite cement can be used.

For example, Tricodur, obtainable from Sika Deutschland GmbH, can be used as the cement suspension.

In one preferred embodiment form, a compound containing calcium can be used as the alkali storage system. This is preferably calcium hydroxide ($Ca(OH)_2$). The use of calcium hydroxide ($Ca(OH)_2$) is advantageous in that the characteristic physical values of the mortar are not impaired.

It is especially preferred if the filling body provided with openings is completely embedded in the mortar, because the filling body is thereby prevented from being corroded.

In one preferred embodiment form, with the invention-specific method, after step b) and before step c), a customary effective surface is made available. This means that after embedding of the filling body in the mortar, a smooth surface is provided, free of pores and cavities and easy to clean.

The mortar to be applied in step b) of the invention-specific method is preferably applied in a Colgunite process, in a dry spraying process or by manual application. The Colgunite process has the advantages of high spraying power, little recoil or dust, while the dry spraying process has the advantages of great feed width, breaks in the spraying with no expense for cleaning the machines, and operation with simple mechanical technology. Applying the mortar by manual application is less expensive technically.

The cement containing an alkali storage system or cement suspension containing an alkali storage system is preferably inserted in step c) of the invention-specific method using an injection technique. By this means, the contact between the cement containing the alkali storage system and the mortar is optimized. Preferably the pressure is greater than 0 up to 40 bar, and especially preferred greater than 0 to 20 bar. The latter pressure range has the advantage that even slowly setting mortar can be processed in temporally adapted fashion, and the filling body can be filled beforehand.

The invention-specific method can be used in all instances where a classic concrete restoration is carried out and the restoration products, especially the mortar, are subjected to early hydrolysis due to attack from without, especially moisture, and cannot or should not be protected with additional layers under certain circumstances for technical reasons. This holds especially true for structures that may not be covered with diffusion-sealed layers, or for structures that may not be protected by construction materials, for example those which contain organic constituents.

In one particularly preferred embodiment form, the cementitious system is a cementitious system that is subjected to long-duration loading, especially water.

In one further preferred embodiment form, the cementitious system is an inner surface of water containers, preferably an inner surface of potable water containers.

However, the cementitious system can also preferably be an inner surface of waste water structures.

The present invention also relates to a cementitious system which is obtainable by means of the method described above. This therefore contains the cementitious system per se as well as the filling bodies provided with openings, the mortar and the cement containing the alkali storage system.

Additionally, the present invention relates to a cementitious system which comprises a filling body provided with openings, mortar and a cement containing an alkali storage system, which is situated in the filling body provided with openings, and is in contact with the mortar. The particular embodiment forms named earlier in connection with the invention-specific method hold true by analogy for the invention-specific cementitious system.

In what follows, the present invention will be explained in greater detail employing FIG. 1), without being limited to this special embodiment form:

A filling body (1) provided with openings is attached to the cementitious system (2) to be restored. Then, the filling body (1) provided with openings is completely embedded in the Sika-130HD restoration mortar (3). The surface is filled and smoothed, so that a customary finished surface is obtained. When the mortar (3) is still easy to manipulate, the filling body (1) provided with openings is filled and compressed with Tricodur cement suspension (4) at a pressure of about 15 bar. As soon as the restoration mortar has cured, this cement suspension (4) then serves as a storage system for calcium hydroxide. Via the openings, a natural contact arises between the cement suspension (4) and the mortar (3). In this way the latter is continuously supplied with calcium hydroxide, so that the leaching process is permanently countered and the breakdown process that otherwise occurs is significantly slowed.

LIST OF REFERENCE SYMBOLS

1=filling body provided with openings
2=cementitious system to be restored
3=mortar
4=cement suspension

The invention claimed is:

1. Method for restoring a cementitious system, comprising the following steps:
   step a) securing a filling body provided with openings at a distance from said cementitious system to be restored;
   step b) applying mortar to the cementitious system to be restored and to said filling body provided with openings, wherein the filling body provided with the openings is completely embedded in the mortar; and
   step c) introducing a cement containing an alkali storage system into the filling body provided with the openings so that the cement containing an alkali storage system is in contact with the mortar.

2. Method according to claim 1, wherein the cementitious system is mortar or concrete.

3. Method according to claim 1, where the filling body provided with openings is a filling body with holes.

4. Method according to claim 1, wherein the mortar used in step b) complies with the technical rules of the GGWU, working page W 300 (June 2005), working page W 270 (November 2007), and working page W347 (May 2006), and the GCRC guideline (October 2001).

5. Method according to claim 1, wherein a cement suspension is used as the cement containing the alkali storage system.

6. Method according to claim 1, wherein, in the cement, all particles exhibit a size of less than 20 μm.

7. Method according to claim 1, wherein the cement is based on Portland cement or blast furnace cement.

8. Method according to claim 1, wherein a compound containing calcium, is used as the alkali storage system.

9. Method according to claim 1, wherein, after step b) and before step c), a customary effective surface is made available.

10. Method according to claim 1, wherein the mortar to be applied in step b) of the invention-specific method is applied in a Colgunite process, in a dry spraying process or by manual application.

11. Method according to claim 1, wherein the cement containing an alkali storage system is inserted in step c) using an injection technique.

12. Method according to claim 1, wherein the cementitious system is subjected to long-duration moisture loading.

13. Method according to according to claim 1, wherein the cementitious system is an inner surface of water containers, or an inner surface of waste water structures.

14. Cementitious system, obtainable by means of a method according to claim 1.

* * * * *